(12) United States Patent
Oyama et al.

(10) Patent No.: US 11,236,817 B2
(45) Date of Patent: Feb. 1, 2022

(54) GEAR SHIFT OPERATION DEVICE FOR VEHICLE

(71) Applicant: Mazda Motor Corporation, Hiroshima (JP)

(72) Inventors: Hajime Oyama, Aki-gun (JP); Kenji Sasaki, Aki-gun (JP); Junichi Kubo, Aki-gun (JP); Hideyuki Nishi, Aki-gun (JP); Kenta Kubo, Aki-gun (JP); Yasuhiko Shinya, Aki-gun (JP); Takashi Hasegawa, Aki-gun (JP); Shigeo Yoshikawa, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/029,438

(22) Filed: Sep. 23, 2020

(65) Prior Publication Data
US 2021/0108717 A1 Apr. 15, 2021

(30) Foreign Application Priority Data

Oct. 10, 2019 (JP) .............................. JP2019-186710

(51) Int. Cl.
*F16H 59/02* (2006.01)
(52) U.S. Cl.
CPC . *F16H 59/0204* (2013.01); *F16H 2059/0239* (2013.01); *F16H 2059/0295* (2013.01)
(58) Field of Classification Search
CPC ..... F16H 2059/0295; F16H 2059/0239; F16H 59/0204; F16H 2061/243; F16H 2061/245
See application file for complete search history.

(56) References Cited

U.S. PATENT DOCUMENTS

| | | | | |
|---|---|---|---|---|
| 5,493,931 A | * | 2/1996 | Niskanen | ............... F16H 59/04 267/150 |
| 9,890,849 B1 | * | 2/2018 | Hall | ........................ G08B 6/00 |
| 2003/0172762 A1 | * | 9/2003 | Ehrmaier | ............ F16H 59/0204 74/473.33 |
| 2005/0139031 A1 | * | 6/2005 | Giefer | ................ F16H 59/0204 74/473.15 |
| 2005/0235769 A1 | * | 10/2005 | Kliemannel | ........ F16H 59/0204 74/473.1 |
| 2006/0053930 A1 | * | 3/2006 | Morita | .................... F16H 59/10 74/473.18 |

(Continued)

FOREIGN PATENT DOCUMENTS

| | | | | |
|---|---|---|---|---|
| JP | H10-287144 | * | 10/1998 | ............. F16H 59/10 |
| JP | 2015054527 A | | 3/2015 | |

*Primary Examiner* — Howard J Sanders
*Assistant Examiner* — Gregory T Prather
(74) *Attorney, Agent, or Firm* — Alleman Hall Creasman & Tuttle LLP

(57) ABSTRACT

A gear shift operation device for a vehicle to which a multiple-stage automatic transmission is mounted, is provided. By a control lever being manually operated in a range switchable mode, a range position is switched at least between a D-range where automatic transmission is performed and an R-range, and by the control lever being manually operated in a manual transmission mode, a gear change is performed. An operation reaction force when the control lever is manually operated is set larger when the gear change is performed in the manual transmission mode than when the range position is switched in the range switchable mode.

14 Claims, 5 Drawing Sheets

(56) References Cited

U.S. PATENT DOCUMENTS

| | | | |
|---|---|---|---|
| 2006/0248976 A1* | 11/2006 | Sickart | F16H 59/0204 74/473.18 |
| 2007/0068324 A1* | 3/2007 | Wittkopp | F16H 63/206 74/523 |
| 2008/0148894 A1* | 6/2008 | Rapin | F16H 61/24 74/473.21 |
| 2008/0295632 A1* | 12/2008 | Prat | F16H 59/105 74/473.3 |
| 2011/0138955 A1* | 6/2011 | Sickart | F16H 59/105 74/473.3 |
| 2014/0149005 A1* | 5/2014 | Heo | F16H 59/08 701/51 |
| 2014/0216193 A1* | 8/2014 | Lindner | F16H 59/10 74/473.3 |
| 2017/0059034 A1* | 3/2017 | Makimura | F16H 59/0278 |
| 2017/0130819 A1* | 5/2017 | Hessel | F16H 61/22 |
| 2017/0159799 A1* | 6/2017 | Fribus | F16H 59/0204 |
| 2018/0094719 A1* | 4/2018 | Hill | F16H 59/0204 |
| 2018/0283543 A1* | 10/2018 | Cha | F16H 59/10 |
| 2018/0320780 A1* | 11/2018 | Heo | F16H 57/0006 |
| 2018/0340607 A1* | 11/2018 | Uenomachi | G05G 1/04 |

* cited by examiner

GEAR SHIFT OPERATION DEVICE FOR VEHICLE

TECHNICAL FIELD

The present disclosure relates to a gear shift operation device for a vehicle.

BACKGROUND OF THE DISCLOSURE

Increasing number of vehicles (particularly, automobiles) carry a multi-stage automatic transmission. The automatic transmission automatically performs a gear change according to a traveling state of the vehicle (e.g., a vehicle speed and an engine load as parameters).

Some automatic transmissions can be changed into a manual transmission mode in addition to a range switchable mode in which, for example, a range position is switchable by manually operating a pivotable control lever. In the range switchable mode, at least an R-range, and a D-range where automatic transmission is performed during the vehicle traveling forward can be selected. In the manual transmission mode, it is common to allow performance of an upshift or a downshift by a manual operation of the control lever.

JP2015-054527A discloses a device in which a stroke amount of a control lever in a manual transmission mode is set smaller than a stroke amount of the control lever in a range switchable mode to allow a quicker operation of the control lever in the manual transmission mode than the range switchable mode.

In the manual transmission mode, since an operator can change the gear at his/her preferred timing, this mode is particularly positively selected by those who like sports driving.

Meanwhile, when those operators who often use gear changes in the manual transmission mode operate the control lever, they have a strong expectation of a sufficient response or resistance as they perform a shift operation in a manual transmission. That is, because the operators are able to feel a sufficient response when he/she operate the shift lever in the manual transmission, he/she strongly expects a sufficient response also for the operation of the control lever in the manual transmission mode.

However, conventionally, the control lever in the manual transmission mode is only considered to be a switch for performing an upshift or downshift request, and a sufficient response which the operator expects is not considered at all.

SUMMARY OF THE DISCLOSURE

The present disclosure is made in view of the above situation, and one purpose thereof is to provide a gear shift operation device in which a sufficient response is acquired when a control lever is operated in a manual transmission mode.

According to one aspect of the present disclosure, a gear shift operation device for a vehicle to which a multiple-stage automatic transmission is mounted, is provided. The gear shift operation device includes a control lever configured to be manually operated in a range switchable mode, whereby a range position is switched at least between a D-range where automatic transmission is performed and an R-range, and manually operated in a manual transmission mode, whereby a gear change is performed. An operation reaction force when the control lever is manually operated is set larger when the gear change is performed in the manual transmission mode than when the range position is switched in the range switchable mode.

According to this configuration, in the manual transmission mode, a sufficient response or resistance is imparted when the control lever is operated in a front-and-rear direction. Particularly, it becomes easier for an operator to perceive more sufficient response to the operation of the control lever in the manual transmission mode, since the operator subconsciously compares the operation reaction force in the manual transmission mode with smaller operation reaction force in the range switchable mode. Moreover, in the range switchable mode, the operation reaction force of the control lever is prevented from being unnecessarily increased.

The control lever may be operable in a front-and-rear direction and a left-and-right direction. By operating the control lever in the left-and-right direction, the mode may be switched between the range switchable mode and the manual transmission mode. In the range switchable mode, the R-range may be selected by operating the control lever to one side in the front-and-rear direction, and the D-range may be selected by operating the control lever to the other side in the front-and-rear direction. In the manual transmission mode, an upshift may be performed by operating the control lever to one side in the front-and-rear direction, and a downshift may be performed by operating the control lever to the other side in the front-and-rear direction. An operation reaction force of the control lever in the front-and-rear direction in the manual transmission mode may be set larger than an operation reaction force of the control lever in the front-and-rear direction in the range switchable mode. In this case, by using the pivoting of the control lever in four directions, the switching between the range switchable mode and the manual transmission mode, the switching of range positions in the range switchable mode, and the shift operation in the manual transmission mode, can be performed.

An amount of stroke of the control lever performed in the range switchable mode for switching the range position may be the same as an amount of stroke of the control lever performed in the manual transmission mode for requesting a gear change. In this case, it is suitable for making the operator perceive more clearly the difference in the operation reaction force of the control lever between the range switchable mode and the manual transmission mode, and perceive a more sufficient response to the operation of the control lever in the manual transmission mode.

The operation reaction force to the control lever may be imparted by a detent mechanism both in the range switchable mode and the manual transmission mode. In this case, the operation reaction force can be set desirably with a generally adopted simple mechanism.

The control lever may be of a momentary type in which the control lever is automatically returned to a neutral position when the range position is switched in the range switchable mode. The control lever may be of a momentary type in which the control lever is automatically returned to the neutral position when a gear change is requested in the manual transmission mode. In this case, by adopting the same momentary type both in the range switchable mode and the manual transmission mode, this can make the operator perceive a more sufficient response to the operation of the control lever in the manual transmission mode while he/she is conscious of the smaller operation reaction force in the range switchable mode. Moreover, the operation to manually return the control lever to the neutral position can be omitted and it is suitable in terms of promptly preparing for the next gear change in the manual transmission mode.

The switching of the mode between the range switchable mode and the manual transmission mode may be performed by the control lever. The control lever may be of a stationary type in which the control lever is held in place when the mode is switched between the range switchable mode and the manual transmission mode. In this case, it is suitable for making the operator perceive clearly in which mode the control lever is between the range switchable mode and the manual transmission mode. Moreover, it is also suitable for allowing the operator to predict in advance the difference in the operation reaction force to the operation of the control lever.

DETAILED DESCRIPTION OF THE DISCLOSURE

Figure 1:
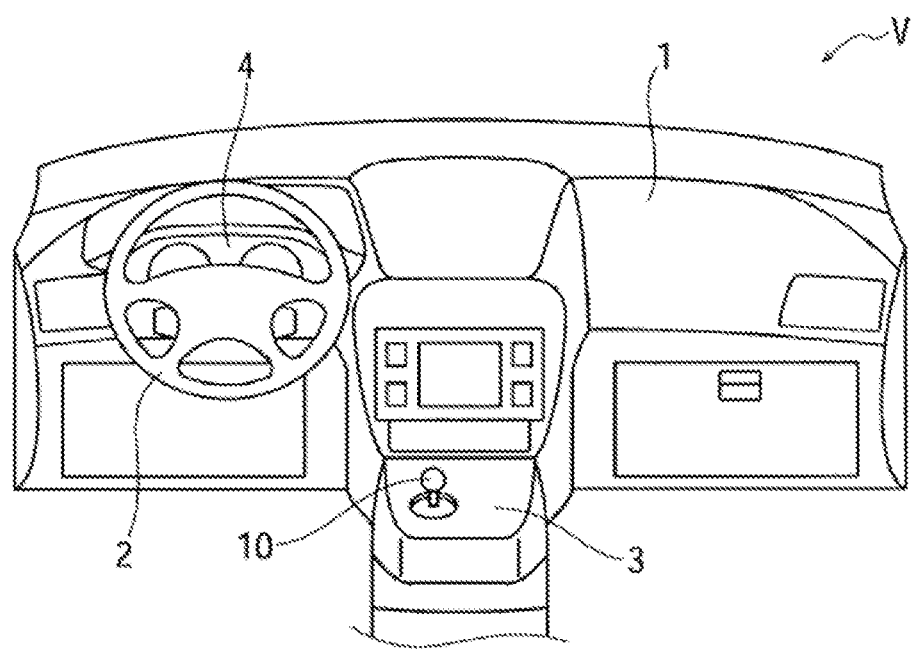
FIG. 1 is a view illustrating an instrument panel and a gear shift operation device for a transmission of a vehicle, seen from the rear.

FIG. 1 illustrates a structure of a front part of a cabin of a vehicle V. In FIG. 1, the vehicle V includes an instrument panel 1, a steering wheel 2, and a console box 3. The instrument panel 1 is provided with a meter panel 4 which is located in front of the steering wheel 2. A control lever (shift lever) 10 for transmission is disposed in an upper surface of the console box 3, at a location where an operator is easy to operate.

Figure 2:
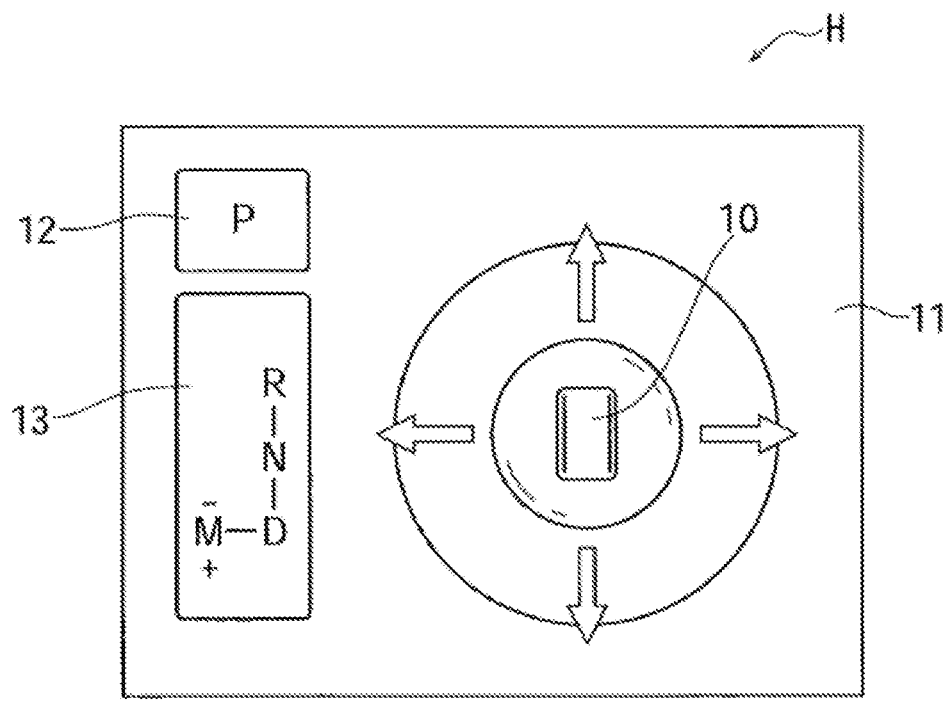
FIG. 2 is a view illustrating the gear shift operation device of FIG. 1, seen from above.

FIG. 2 illustrates an entire gear shift operation device H including the control lever 10. The gear shift operation device H has a panel part 11 surrounding the control lever 10, in addition to the control lever 10, and the panel part 11 is provided with a switch 12 for selecting a P-range and a display part 13.

As illustrated by arrows in FIG. 2 seen from above, the control lever 10 is pivotable in four directions of the front, rear, right, and left (pivoting in the left-and-right direction more than a given amount and pivoting in the front-and-rear direction more than a given mount are regulated). By pivoting of the control lever 10 in the left-and-right direction, a mode is switched (selected) between a range switchable mode and a manual transmission mode. That is, in the state of FIG. 2, the control lever 10 is located at a position on the range switchable mode, and from this position, it becomes into the manual transmission mode by pivoting the control lever 10 leftward.

Figure 6:
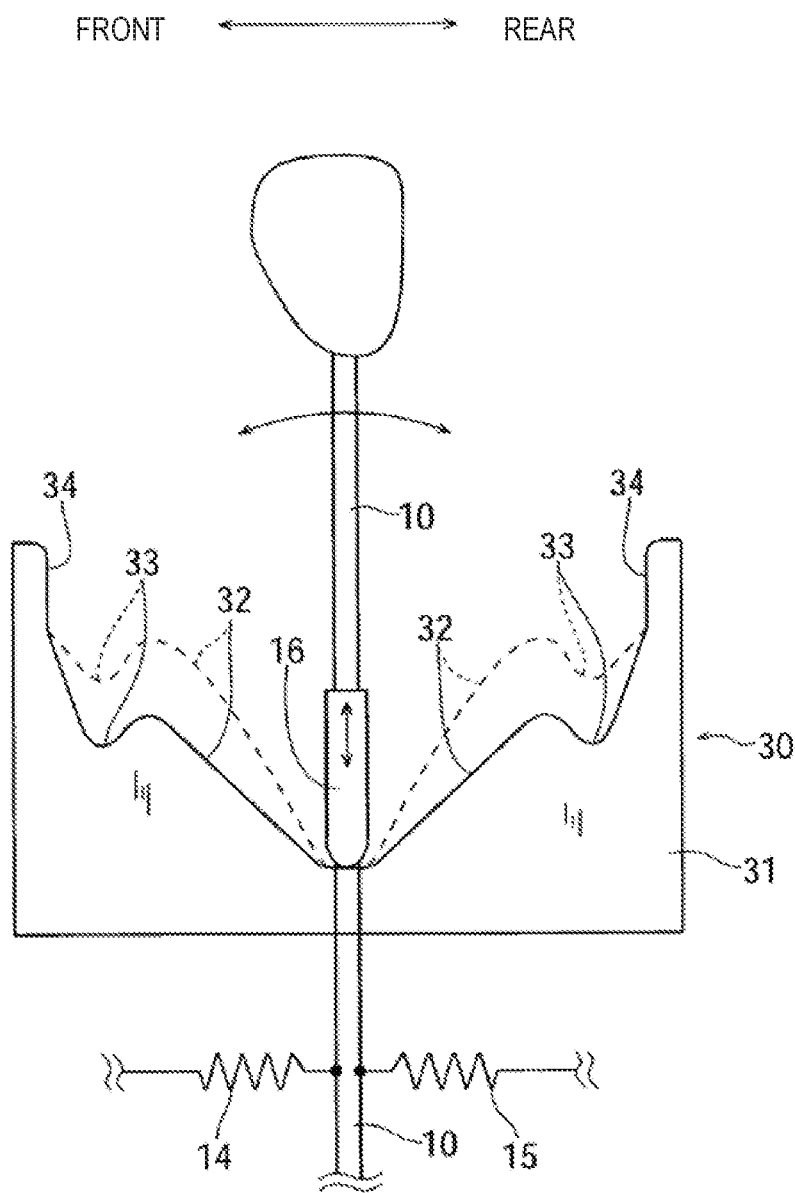
FIG. 6 is a side view illustrating one example of a mechanism which imparts a reaction force to the motion of the control lever in a front-and-rear direction.

The control lever 10 is of a stationary type for pivoting in the left-and-right direction in which it is held in place at the pivoted position. On the other hand, the control lever 10 is of a momentary type for pivoting in the front-and-rear direction in which the control lever 10 is automatically resumed to a neutral position in the front-and-rear direction when the operating force for pivoting the control lever 10 forward or rearward is canceled. Therefore, as illustrated in FIG. 6, one of end parts of each of a pair of return springs 14 and 15 is attached to the control lever 10. The other end part of each of the return springs 14 and 15 is fixed to a vehicle body.

In the range switchable mode, when the control lever 10 is pivoted forward, it is a choice of a reverse range (R-range), and on the other hand, when it is pivoted rearward, it is a choice of a drive range (D-range). In the manual transmission mode, when the control lever 10 is pivoted forward, it is an instruction of a downshift, and on the other hand, when it is pivoted rearward, it is an instruction of an upshift.

The switch 12 is, for example, of a push type, and each time it is pressed, the range is switched between a parking range (P-range) and a "P-range Disengaged." Immediately after the P-range Disengaged, it becomes a choice of a neutral range (N-range). The display part 13 indicates, by a character, where the control lever 10 is located. For example, the range position selectable in the range switchable mode includes "R" (R-range), "N" (neutral range, as well as a neutral return position of the control lever 10), and "D" (D-range) in this order from the forward (upward in FIG. 2) to the rearward. Moreover, on the left side of "R-N-D" which extends in the front-and-rear direction, "M" indicative of the manual transmission mode (M-range=manual transmission mode) is displayed. In front of "M," "−" indicative of a downshift, and behind "M," "+" indicative of an upshift are displayed.

The indication according to the operating position of the control lever 10 is displayed on the meter panel 4. In detail, at P-range, the indication of "P" is performed, at R-range, the indication of "R" is performed, and at D-range, the indication of "D" is performed. When the manual transmission mode is selected, the current gear stage is displayed (e.g., when the current gear stage is 4th gear, "4" is displayed, and when the current gear stage is 3rd gear, "3" is displayed). Note that in the manual transmission mode, "M" can be displayed additionally or alternatively to the indication of the current gear stage.

Note that the manual transmission mode is selectable only under the condition that D-range is selected. Moreover, R-range is selectable only under the condition that the vehicle is stopped.

Figure 4:
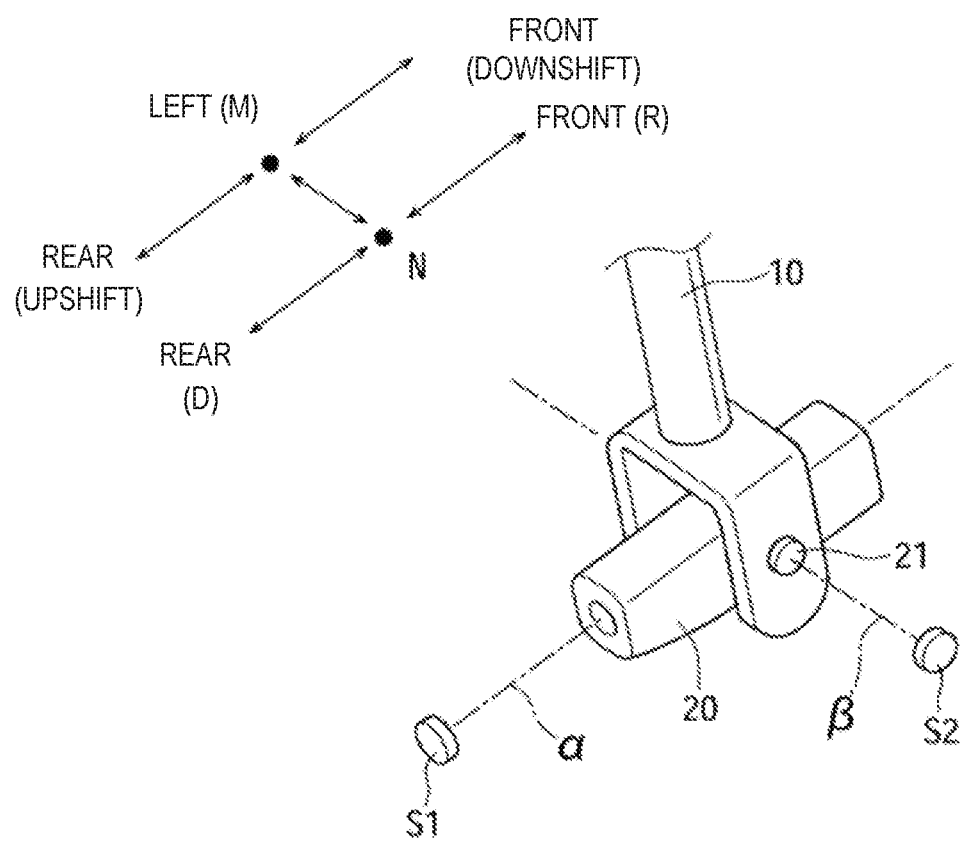
FIG. 4 is a perspective view illustrating a substantial part of a structure near a base-end part of a control lever.

FIG. 4 illustrates a structure near a base-end part of the control lever 10. In FIG. 4, a mounting shaft 20 extending in the front-and-rear direction is held by the vehicle body so as to be rotatable about an axis a in the front-and-rear direction. The base-end part of the control lever 10 is coupled to the mounting shaft 20 by a pin 21 so as to be pivotable in the front-and-rear direction. A rotation axis of the mounting shaft 20 is illustrated by "α," and a pivot axis centering on the pin 21 of the control lever 10 is illustrated by "β."

A rotation angle of the mounting shaft 20 (the location of the control lever 10 in the left-and-right direction) is detected by a sensor S1. Moreover, a pivot angle of the control lever 10 in the front-and-rear direction is detected by a sensor S2. The sensors S1 and S2 constitute a position detector of the control lever 10.

Figure 5:
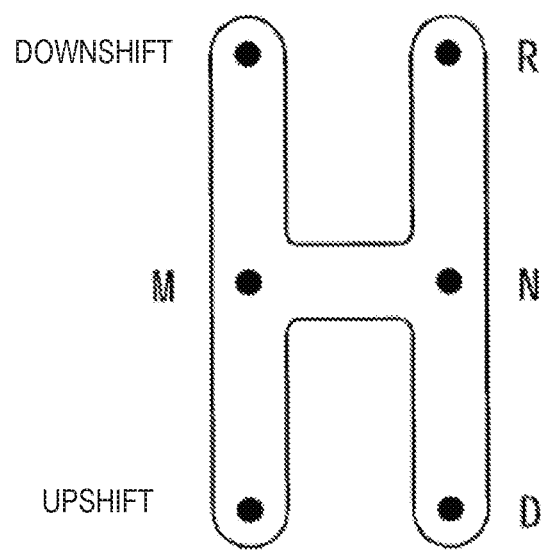
FIG. 5 is a plan view illustrating a motion of the control lever forward, rear, right, and left.

FIG. 5 comprehensively illustrates a relationship of the positions for transmission which can be set according to the pivot of the control lever 10 to the front, rear, right, and left as described above (motion of an H-shaped pattern in a plan view).

Figure 3:
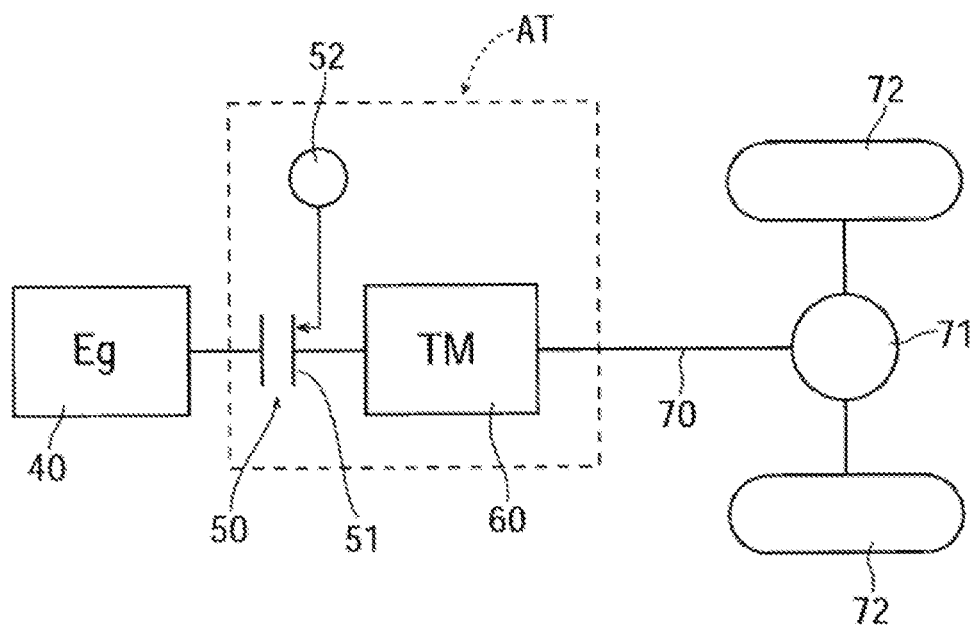
FIG. 3 is a plan view schematically illustrating one example of a drive system of the vehicle.

Next, one example of a driving system of the vehicle V is described with reference to FIG. 3. A driving force of an engine 40 is first transmitted to left and right driving wheels (in the embodiment, rear wheels) 72 through an automatic clutch 50, a multi-stage transmission gear mechanism 60, a propeller shaft 70, and a differential gear 71. An automatic transmission AT is constituted by the automatic clutch 50 and the transmission gear mechanism 60. A gear shift is performed in order of disengagement of the automatic clutch 50, a gear change of the transmission gear mechanism 60, and engagement of the automatic clutch 50.

The automatic clutch 50 has, for example, a wet multi-plate clutch 51, and an electric motor 52 as an electric actuator. Connection and disconnection of the clutch 51 is performed by the electric motor 52. In detail, the clutch 51 is normally in a disengagement state by a spring (not illustrated). Then, by a driving force of the electric motor 52, the clutch 51 is engaged while resisting the spring force.

The multi-stage transmission gear mechanism 60 is constructed, for example, using a planetary gear mechanism, and has six speeds forward and one speed reverse. The transmission gear mechanism 60 has a plurality of clutches and a plurality of brakes as known hydraulic internal friction engagement elements. According to a combination of engagement and disengagement of the plurality of internal friction engagement elements, any of all the gear stages can be selectively formed. Note that the number of forward gear stages is not limited in particular, and, for example, it may be seven stages or eight stages.

Next, a structure of a part associated with the control lever 10 is further described with reference to FIG. 6. First, a detent mechanism 30 is provided so as to be associated with the control lever 10. A pair of left and right detent mechanisms 30 are provided for the range switchable mode and the manual transmission mode. The detent mechanism 30 imparts a given click feel and a given reaction force to operation of the control lever 10.

The detent mechanism 30 has a guide wall part 31 extending in the front-and-rear direction. In an upper surface of the guide wall part 31, an inclined part 32 which gradually rises, as it goes forward or rearward, from the neutral position of the control lever 10, a recess 33 which drops gradually, and a regulating wall part 34 which rises rapidly, are formed. Note that the inclined part 32, the recess 33, and the regulating wall part 34 are symmetrically formed forward and rearward with respect to the neutral position of the control lever 10.

A slider (guide pin) 16 is attached to (an arm part of) the control lever 10 so as to be slidable in the vertical direction. The slider 16 is normally biased downwardly by a spring (not illustrated) disposed inside the control lever 10.

A lower end of the slider 16 is normally brought into contact with the upper surface of the guide wall part 31. Thus, as the control lever 10 is pivoted forward or rearward from the neutral position illustrated in FIG. 6, it receives a large reaction force while passing through the inclined part 32, it is given a click feel when it reaches the recess 33, and pivoting more than this location is regulated when it reaches the regulating wall part 34. The mountain-shaped part (protrusion) including the inclined part 32 serves as resisting stepped parts for the slider 16 to get over.

Note that in FIG. 6, the mountain-shaped parts, such as the inclined part 32, are exaggerated for easier understanding, and therefore, the actual shape may be different. Moreover, the slider 16 may be any kind of types, for example, it may be a roller type which can roll over the upper surface of the guide wall part 31.

A solid line illustrated in FIG. 6 indicates the inclined parts 32, the recesses 33, and the regulating wall parts 34 when the control lever 10 is in the range switchable mode. Moreover, a broken line illustrate in FIG. 6 indicates the inclined parts 32, the recesses 33, and the regulating wall parts 34 when the control lever 10 is in the manual transmission mode. The inclined parts 32 and the recesses 33 illustrated by the broken line (manual transmission mode) are set higher than the inclined parts 32 and the recesses 33 illustrated by the solid line (range switchable mode). Thus, in the manual transmission mode, a larger operating force (i.e., a larger reaction force) needs to be imparted when pivoting the control lever 10 in the front-and-rear direction than in the range switchable mode.

As described above, in the manual transmission mode, a sufficient response or resistance is imparted when the control lever 10 is operated in the front-and-rear direction, as compared with the case in the range switchable mode. Particularly, since in the range switchable mode the operation reaction force when operating the control lever 10 in the front-and-rear direction is set smaller, it becomes easier for the operator to perceive a more sufficient response to the operation of the control lever 10 in the front-and-rear direction in the manual transmission mode, as unconsciously compared with the smaller operation reaction force in the range switchable mode.

A pivoting amount of the control lever 10 forward (maximum stroke amount) is the same in the range switchable mode and the manual transmission mode. Similarly, a pivoting amount of the control lever 10 rearward (maximum stroke amount) is the same in the range switchable mode and the manual transmission mode. This makes the operator perceive more clearly the difference in the operation reaction force (response) of the control lever 10 in the front-and-rear direction between the range switchable mode and the manual transmission mode.

Figure 7:
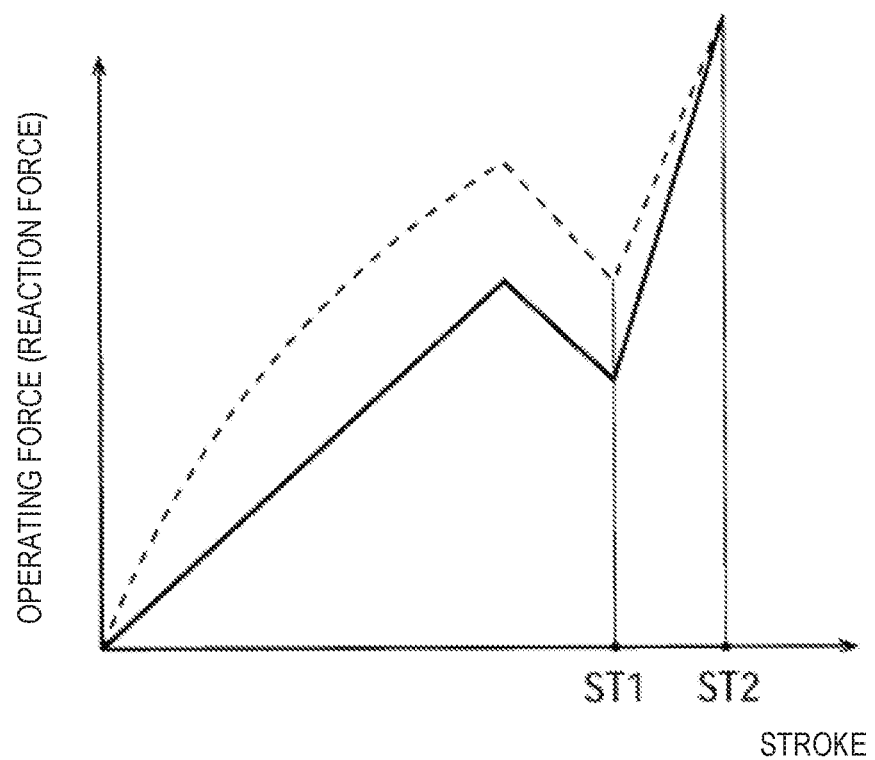
FIG. 7 is a characteristic graph illustrating a relationship between a stroke of the control lever in the front-and-rear direction and an operating force.

FIG. 7 illustrates a relationship between the pivoting stroke amount and the operating force (reaction force) of the control lever 10 in the front-and-rear direction. In FIG. 7, a solid line corresponds to the range switchable mode, and a broken line corresponds to the manual transmission mode.

In FIG. 7, when the slider 16 of the control lever 10 reaches (bottom of) the recess 33, the stroke amount of the control lever 10 is illustrated by ST1. Then, when the control lever 10 reaches the stroke amount ST1, a gear change (gear stage change) is started by the transmission gear mechanism 60. After the stroke amount ST1 is reached, the control lever 10 is still more operational to a stroke amount ST2, but the gear change (gear stage change) by the transmission gear mechanism 60 is completed within a short period of time before reaching the stroke amount ST2.

Further describing about FIG. 7, in the manual transmission mode, the reaction force from the inclined part 32 becomes larger and the reaction force of the spring which presses the slider 16 downwardly also becomes larger, as compared with the case in the range switchable mode, and therefore, a larger operation reaction force is imparted in this manual transmission mode to the pivoting of the control lever 10 in the front-and-rear direction.

Moreover, the gear change (gear stage change) of the transmission gear mechanism 60 is started when (the slider 16 of) the control lever 10 reaches the recess 33 (when the stroke amount ST1 is reached). Therefore, since the gear change is started at the same time as the click feel is imparted by the control lever 10 reaching the recess 33, the operation feel almost similar to the case where the shift lever is operated in a manual transmission (shift operation feel) can be provided to the operator.

Although the embodiment is described above, the present disclosure is not limited to this embodiment but suitable changes are possible within the scope of the appended claims, and, for example, the changes may include the followings. The automatic transmission AT may have a suitable structure, and, for example, it may use a torque converter with a lock-up clutch, instead of the automatic clutch 50. The switching between the range switchable mode and the manual transmission mode may be performed, for example, by a switch which is separately provided, without being performed by the control lever 10.

The operation reaction force to the control lever 10 in the front-and-rear direction can be imparted by a suitable approach. For example, the operation reaction force may be differentiated between the range switchable mode and the manual transmission mode by using an electromagnetic actuator coupled to the control lever 10. Alternatively, a pair of front and rear compression springs which are compressed when the control lever 10 is operated to forward and rearward may be provided for the range switchable mode and the manual transmission mode, respectively. Spring reaction forces of the pair of front and rear compression springs for the manual transmission mode may be set larger than the spring reaction forces for the range switchable mode. The change of P-range, R-range, N-range, and D-range may be performed by the control lever 10 in the range switchable mode (in this case, the control lever 10 is of the stationary type which is held in place at the current range position). Of course, the purpose of the present disclosure is not limited to those explicitly described, and also implicitly includes those expressed to be substantially desirable or advantageous.

The present disclosure is suitable as a gear shift operation device of an automatic transmission having a manual transmission mode.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

V: Vehicle
H: Shift Operation Input Device
AT: Automatic Transmission
S1: Sensor (Detection of Location of Control Lever)
S2: Sensor (Detection of Location of Control Lever)
1: Instrument Panel
2: Steering Wheel
3: Console Box
4: Meter Panel
10: Control Lever
50: Automatic Clutch
51: Clutch
52: Electric Motor
60: Transmission Gear Mechanism

What is claimed is:

1. A gear shift operation device for a vehicle to which a multiple-stage automatic transmission is mounted, the gear shift operation device comprising:
a control lever configured to be manually operated in a range switchable mode, whereby a range position is switched at least between a D-range where automatic transmission is performed and an R-range, and manually operated in a manual transmission mode, whereby a gear change is performed,
wherein an operation reaction force when the control lever is manually operated is set larger when the gear change is performed in the manual transmission mode than when the range position is switched in the range switchable mod,
wherein the control lever is of a momentary type in which the control lever is automatically returned to a neutral position after the range position is switched in the range switchable mode, and
wherein the control lever is of a momentary type in which the control lever is automatically returned to the neutral position after a gear change is requested in the manual transmission mode.

2. The gear shift operation device of claim 1,
wherein the control lever is operable in a front-and-rear direction and a left-and-right direction,
wherein, by operating the control lever in the left-and-right direction, the mode is switched between the range switchable mode and the manual transmission mode,
wherein, in the range switchable mode, the R-range is selected by operating the control lever to one side in the front-and-rear direction, and the D-range is selected by operating the control lever to the other side in the front-and-rear direction,
wherein, in the manual transmission mode, an upshift is performed by operating the control lever to one side in the front-and-rear direction, and a downshift is performed by operating the control lever to the other side in the front-and-rear direction, and
wherein an operation reaction force of the control lever in the front-and-rear direction in the manual transmission mode is set larger than an operation reaction force of the control lever in the front-and-rear direction in the range switchable mode.

3. The gear shift operation device of claim 2, wherein an amount of stroke of the control lever performed in the range switchable mode for switching the range position is the same as an amount of stroke of the control lever performed in the manual transmission mode for requesting a gear change.

4. The gear shift operation device of claim 3, wherein the operation reaction force to the control lever is imparted by a detent mechanism both in the range switchable mode and the manual transmission mode.

5. The gear shift operation device of claim 2, wherein the operation reaction force to the control lever is imparted by a detent mechanism both in the range switchable mode and the manual transmission mode.

6. The gear shift operation device of claim 2, wherein the control lever is of a stationary type in which the control lever is held in place when the mode is switched between the range switchable mode and the manual transmission mode.

7. The gear shift operation device of claim 1, wherein an amount of stroke of the control lever performed in the range switchable mode for switching the range position is the same as an amount of stroke of the control lever performed in the manual transmission mode for requesting a gear change.

8. The gear shift operation device of claim 7, wherein the operation reaction force to the control lever is imparted by a detent mechanism both in the range switchable mode and the manual transmission mode.

9. The gear shift operation device of claim 7,
wherein the switching of the mode between the range switchable mode and the manual transmission mode is performed by the control lever, and
wherein the control lever is of a stationary type in which the control lever is held in place when the mode is switched between the range switchable mode and the manual transmission mode.

10. The gear shift operation device of claim 1, wherein the operation reaction force to the control lever is imparted by a detent mechanism both in the range switchable mode and the manual transmission mode.

11. The gear shift operation device of claim 10,
wherein the switching of the mode between the range switchable mode and the manual transmission mode is performed by the control lever, and
wherein the control lever is of a stationary type in which the control lever is held in place when the mode is switched between the range switchable mode and the manual transmission mode.

12. The gear shift operation device of claim 1,
wherein the switching of the mode between the range switchable mode and the manual transmission mode is performed by the control lever, and
wherein the control lever is of a stationary type in which the control lever is held in place after the mode is switched between the range switchable mode and the manual transmission mode.

13. A gear shift operation device for a vehicle to which a multiple-stage automatic transmission is mounted, the gear shift operation device comprising:
a control lever configured to be manually operated in a range switchable mode, whereby a range position is switched at least between a D-range where automatic transmission is performed and an R-range, and manually operated in a manual transmission mode, whereby a gear change is performed,
wherein an operation reaction force when the control lever is manually operated is set larger when the gear change is performed in the manual transmission mode than when the range position is switched in the range switchable mode,
wherein the control lever is operable in a front-and-rear direction and a left-and-right direction,
wherein, by operating the control lever in the left-and-right direction, the mode is switched between the range switchable mode and the manual transmission mode,
wherein, in the range switchable mode, the R-range is selected by operating the control lever to one side in the front-and-rear direction, and the D-range is selected by operating the control lever to the other side in the front-and-rear direction,
wherein, in the manual transmission mode, an upshift is performed by operating the control lever to one side in the front-and-rear direction, and a downshift is performed by operating the control lever to the other side in the front-and-rear direction,
wherein an operation reaction force of the control lever in the front-and-rear direction in the manual transmission mode is set larger than an operation reaction force of the control lever in the front-and-rear direction in the range switchable mode,
wherein an amount of stroke of the control lever performed in the range switchable mode for switching the range position is the same as an amount of stroke of the control lever performed in the manual transmission mode for requesting a gear change,
wherein the control lever is of a momentary type in which the control lever is automatically returned to a neutral position when the range position is switched in the range switchable mode, and
wherein the control lever is of a momentary type in which the control lever is automatically returned to the neutral position when a gear change is requested in the manual transmission mode.

14. The gear shift operation device of claim 13, wherein the control lever is of a stationary type in which the control lever is held in place when the mode is switched between the range switchable mode and the manual transmission mode.

* * * * *